No. 892,626. PATENTED JULY 7, 1908.
H. F. SELINGER.
ELECTRICAL INSULATOR.
APPLICATION FILED DEC. 12, 1907.
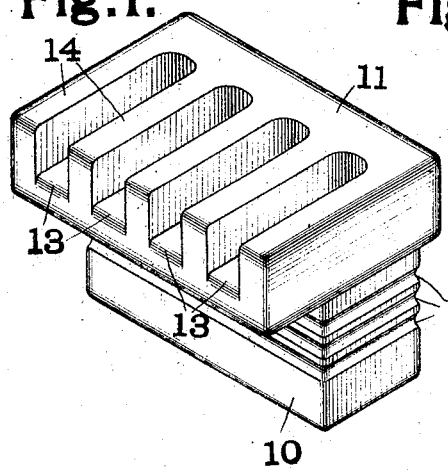
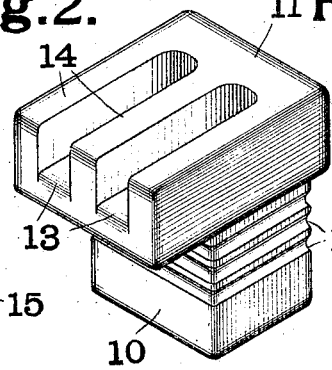
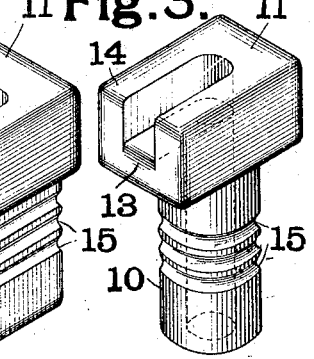
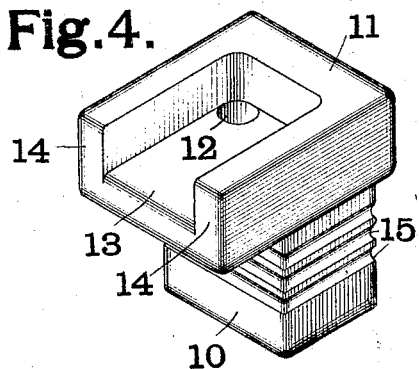
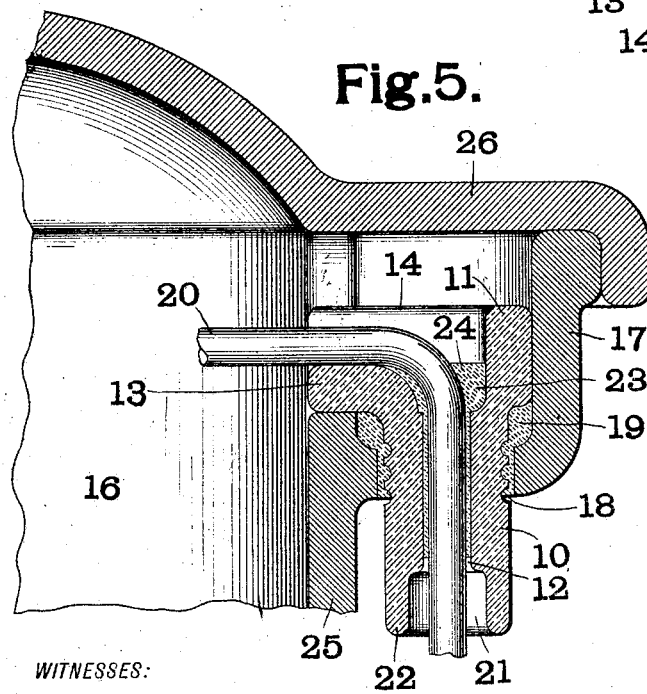
WITNESSES:
L. L. Mead.
W. A. Alexander.
INVENTOR
H. F. Selinger.
BY
Knohr & Bryson
ATTORNEYS

UNITED STATES PATENT OFFICE.

HUGO F. SELINGER, OF ST. LOUIS, MISSOURI, ASSIGNOR TO WAGNER ELECTRIC MANUFACTURING COMPANY, OF ST. LOUIS, MISSOURI, A CORPORATION OF MISSOURI.

ELECTRICAL INSULATOR.

No. 892,626.      Specification of Letters Patent.      Patented July 7, 1908.

Application filed December 12, 1907. Serial No. 406,217.

*To all whom it may concern:*

Be it known that I, HUGO F. SELINGER, a citizen of the United States, residing at the city of St. Louis, in the State of Missouri, have invented a certain new and useful Electrical Insulator, of which the following is such a full, clear, and exact description as will enable any one skilled in the art to which it appertains to make and use the same, reference being had to the accompanying drawings, forming part of this specification.

My invention relates to an electrical insulator and more particularly to an insulator in the general form of a bushing such as is suitable for insulating the leading in and leading out wires of a transformer, or other electrical device contained in a metallic casing. It is essential that the conductors of such device be prevented from coming in contact with the metallic casing or housing. I have found that the ordinary straight form of bushing usually heretofore used is not effective for this purpose especially when the transformer or other device is portable, as the wires or conductors are liable to be displaced a considerable distance when the device is moved. The wires or conductors may thus be allowed to come in contact with the casing thereby grounding the circuit or device on the box or even short-circuiting the circuit or device.

One object of my invention is to construct an insulator which will effectively overcome the above defects in the form of insulator bushings heretofore used. To this end I employ a bushing provided with a head having a channel substantially at right angles to the opening in the body of the insulator, said channel being formed by a lip which separates the conductor from the wall of the casing and by flanges which prevent the lateral movement of the conductor.

Another object of my invention is to so construct the insulator as to prevent the collection and retention of water around the conductor at the point where it leaves the insulator.

Still another object of my invention is to provide improved means for cementing the conductor in place in the insulator.

In the accompanying drawings which illustrate some forms of insulator made in accordance with my invention, Figure 1 is an isometric projection showing an insulator adapted to receive four conductors; Fig. 2 is a similar view showing an insulator adapted to receive two conductors; Fig. 3 is a similar view showing an insulator adapted to receive one conductor; Fig. 4 is a view similar to Fig. 2 but showing a slight modification and Fig. 5 is a vertical section through one of the insulators and a portion of a transformer casing to which the same is applied.

Like marks of reference refer to similar parts in the several views of the drawings.

The insulator which may be made of porcelain or any other suitable material, consists of a body portion 10 and a head 11. The body portion 10 may be of any suitable form. It is preferably cylindrical when the device is intended for a single conductor, as shown in Fig. 3, and preferably rectangular whenever a greater number of conductors, as shown in Figs. 1, 2 and 4. Formed in the body 10 are one or more passages 12 for the conductors. These passages 12 communicate with channels formed in the heads 11. These channels are substantially at right angles to the passages 12 and are formed by means of lips 13 and flanges 14.

In the preferred form of my device, as shown in Figs. 1, 2 and 3, the flanges 14 are sufficient in number to form a separate channel for each passage in the body 10. The flanges, however, may be less in number, as shown in Fig. 4, thus forming a single channel for two or more of the passages. In order to aid in securing the body portions 10 of the insulators in position, I prefer to form said body portions 10 with depressions 15.

Referring to Fig. 5, 16 represents the casing of a transformer, said casing being provided with a lateral offset portion 17 having an opening 18 in its bottom. Through this opening 18 the body 10 of the insulator is adapted to project and the insulator may be held in position by means of a suitable cementing material 19 interposed between the casing and insulator, the grooves 15 in the body 10 enabling the cement to secure a firmer hold upon the insulator. 20 is the conductor which passes through the passage 12 in the body of the insulator and is then bent at right angles so as to pass along the channel formed by the lip 13 and flanges 14. In order to prevent water from collecting around the conductor 20 at the point where it leaves the insulator, I provide the lower end of the passage 12 with an enlarged portion 21, thus forming a dripping edge 22 out of contact with the conductor. When the casing is exposed to the weather, any water collecting upon the outside of the body 10 will drip from this edge 22 without collecting around the conductor 20. The upper end of the passage 12 is also preferably enlarged, as shown at 23, so as to form a cement well in which a suitable cementing material 24 may be poured so as to secure the conductor in position. From the cement well 23 this cementing material may run down between the conductor and the insulator to or nearly to the enlarged portion 21 of the passage. 25 represents the wall of the casing and the lip 13 above referred to, is so arranged as to project over this wall and thus effectively prevent the conductor from coming in contact therewith while the flanges 14 prevent all lateral movement of the conductor. 26 represents the cover of the transformer casing.

Having fully described my invention, what I claim as new and desire to secure by Letters Patent of the United States, is:

1. An electrical insulator, comprising a body portion adapted to be secured in a casing and having a passage for a conductor, a head having a projecting lip, and flanges forming with said lip an open top channel substantially at right angles to and communicating with said passage.

2. An electrical insulator, comprising a body portion adapted to be secured in a casing and having a plurality of passages for conductors, a head having a projecting lip and flanges forming with said lip open top channels substantially at right angles to and communicating with said passages.

3. An electrical insulator, comprising a body portion adapted to be secured in a casing and having a passage for a conductor, said passage being enlarged at its lower end to form a dripping edge out of contact with the conductor, and a head provided with a laterally opening channel communicating with said passage.

4. An electrical insulator, comprising a body portion adapted to be secured in a casing and having a passage for a conductor, said passage being enlarged at its upper end to form a cement well, and a head provided with a laterally opening channel communicating with said passage.

5. An electrical insulator, comprising a body portion adapted to be secured in a casing and having a passage for a conductor, said passage being enlarged at its lower end to form a dripping edge out of contact with the conductor and also having an enlargement at its upper end serving as a cement well, and a head provided with a laterally opening channel communicating with said passage.

6. An electrical insulator, comprising a body portion adapted to project through the opening of a casing, provided with external indentations, said body portion also having a passage for a conductor, an enlarged head having a projecting lip and flanges forming with said lip, a channel substantially at right angles to and communicating with said passage.

7. An electrical insulator, comprising a body portion adapted to project through the opening of a casing and provided with external indentations, said body portion also having a plurality of passages for conductors, an enlarged head having a projecting lip and flanges forming with said lip channels substantially at right angles to and communicating with said passages.

8. The combination with a casing for an electrical device, of a lateral offset to said casing provided with an opening in its bottom, an insulator body passing through said opening and provided with a passage for a conductor, and a head on said insulator body provided with a lip extending over the wall of the casing.

9. The combination with a casing for an electrical device, of a lateral offset to said casing provided with an opening in the bottom, an insulator body passing through said opening and provided with a passage for a conductor, a head on said insulator body provided with a lip extending over the wall of said casing, and flanges forming with said lip a channel communicating with said passage.

10. The combination with a casing for an electrical device, of a lateral offset to said casing provided with an opening in the bottom, an insulator body passing through said opening and provided with a passage for a conductor, said passage being enlarged at its lower end to form a dripping edge out of contact with the conductor, a head on said insulator body provided with a lip extending over the wall of said casing, and flanges forming with said lip a channel communicating with said passage.

11. The combination with a casing for an electrical device, of a lateral offset to said casing provided with an opening in the bottom, an insulator body passing through said opening and provided with a passage for a conductor, said passage being enlarged at its upper end to form a cement well, a head on said insulator body provided with a lip extending over the wall of said casing, and flanges forming with said lip a channel communicating with said passage.

12. The combination with a casing for an electrical device, of a lateral offset to said casing provided with an opening in the bottom, an insulator body passing through said opening and provided with a passage for a conductor, said passage being enlarged at its lower end to form a dripping edge out of contact with the conductor, and also enlarged at its upper end to form a cement well, a head on said insulator provided with a lip extending over the wall of said casing, and flanges forming with said lip a channel communicating with said passage.

In testimony whereof I have hereunto set my hand and affixed my seal in the presence of the two subscribing witnesses.

HUGO F. SELINGER. [L. S.]

Witnesses:
   L. GUTMANN,
   WM. J. FINNEGAN